A. N. TIMMS.
SEED GATHERING ATTACHMENT FOR MOWERS.
APPLICATION FILED APR. 14, 1917.
1,249,295. Patented Dec. 4, 1917.
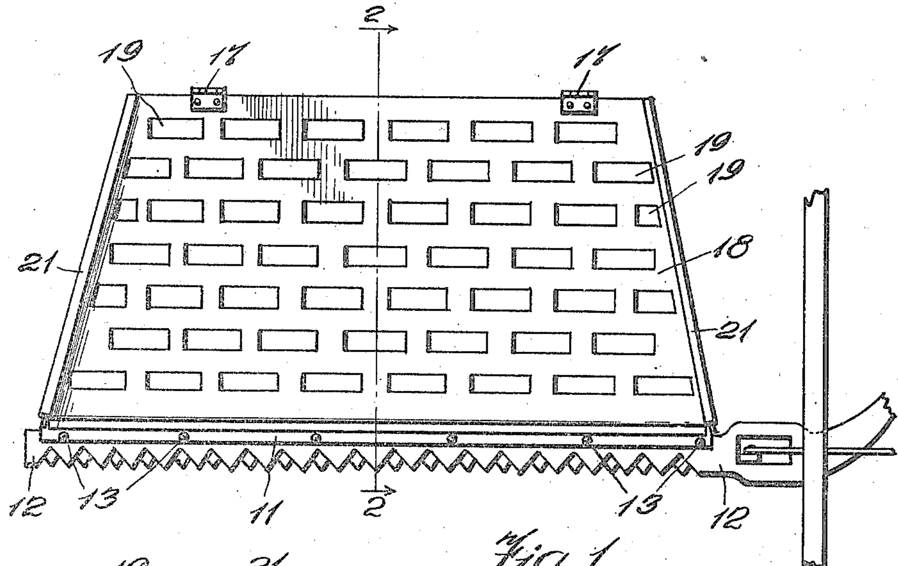
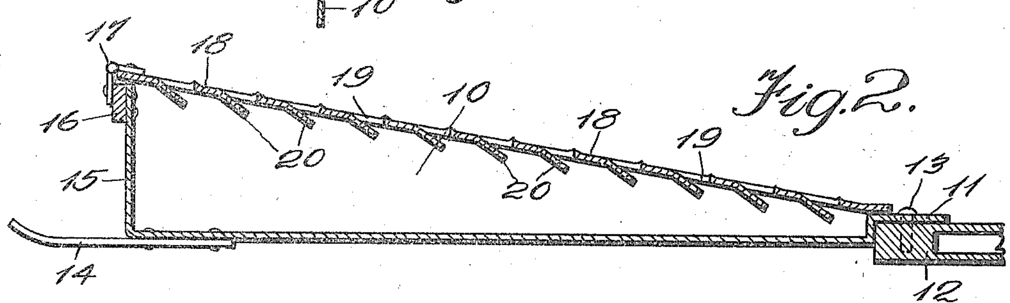
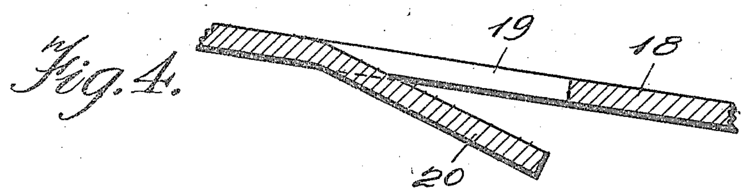
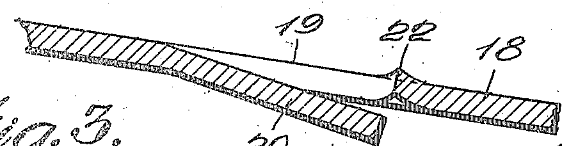
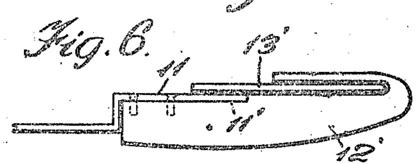
Inventor
A. N. Timms,
By Norman T. Whitaker
Attorney

UNITED STATES PATENT OFFICE.

AMOS N. TIMMS, OF McCOOL, MISSISSIPPI, ASSIGNOR OF ONE-HALF TO A. M. STORER, OF KOSCIUSKO, MISSISSIPPI.

SEED-GATHERING ATTACHMENT FOR MOWERS.

1,249,295. Specification of Letters Patent. Patented Dec. 4, 1917.

Application filed April 14, 1917. Serial No. 161,987.

*To all whom it may concern:*

Be it known that I, AMOS N. TIMMS, a citizen of the United States, and a resident of McCool, in the county of Attala and State of Mississippi, have invented new and useful Improvements in Seed-Gathering Attachments for Mowers, of which the following is a specification.

My invention relates to improvements in seed gathering attachments for mowers.

One object of this invention is to provide a device of the above mentioned character which will enable a vine of peas or clover seed stalks to be drawn clear of the cutter bar of a mower, and the shelled clover seed or peas, as the case may be, retained and prevented from passing rearwardly on to the ground with the vine or stalks.

Another object of this invention is to provide a clover seed attachment for mowers which is easy and cheap to manufacture, strong and durable and which may be readily secured to or removed from the cutter bar of a mower of ordinary construction.

Other objects and advantages will be apparent from the following description and the features of novelty will be particularly pointed out in the appended claims.

In the drawings in which similar characters of reference refer to similar parts in the several views, Figure 1 is a plan view of the device in position upon a cutter bar of a mower, Fig. 2 is a cross sectional view on the line 2—2 of Fig. 1, Fig. 3 is an enlarged detail cross sectional view of one of the struck out portions of the lid showing a raised portion adjacent the front of the opening, Fig. 4 is a modified form of Fig. 3 showing the omission of the raised portion adjacent the front of the opening, and Fig. 5 is an enlarged cross sectional view of a side of the box with the U-shaped edge of the cover in position.

Fig. 6 illustrates a modified form of attachment between the seed box and the finger bar of a mower.

Referring to the drawings and more particularly to Figs. 1 and 2 in constructing an attachment in accordance with my invention, a seed box 10 is provided, which gradually deepens from the front end rearwardly. The sides of the box converge from the front end rearwardly. The front end 11 of the seed box 10 is secured to a cutter bar 12 of a mower by any suitable means, as shown here by bolts 13. The seed box 10 is provided at its rear with runners 14 for an obvious purpose. As shown in Fig. 6 the flange 11 of the seed box may be securely held in a recess 11′ of the finger bar 12′ by means of bolts passed through the flange as indicated, the cutter bar 13 being adapted to reciprocate above the flange of the box.

Secured to the rear wall 15 and near the top thereof is a member 16, preferably formed of wood. This member serves as securing means for hinges 17 to which is secured a cover 18. This cover is shown as tapered in shape, but it is obvious that it could be formed in other shapes to conform to any particular shape of seed box.

The cover 18 is provided with a plurality of openings 19 caused by striking from the material of the cover tongues 20, which are bent inwardly into the seed box. These openings are arranged in longitudinal and transverse rows. The openings of each longitudinal row are arranged in alinement with respect to each other, and in parallel alinement with the openings of each of the other rows, while the openings of each transverse row are staggered with respect to each other. It may be readily seen that the tongues which are struck from the cover to form the openings in each longitudinal row necessarily bear the same relation with respect to each other in longitudinal rows and transverse rows as the openings in longitudinal rows and transverse rows as heretofore described. These tongues 20 will prevent the seed contained in the box 10 from escaping through the openings formed in the cover when the device is operated, due to uneven ground. These openings 19 are, as shown preferably arranged in parallel alinement.

The tongues 20 form in effect a guide or chute for the passage of seed or peas into the seed box 10. The side edges 21 of the cover are formed into substantially U-shaped sockets which fit over the sides of the seed box 10 as shown in Fig. 5, thus preventing an escape of seed which may be contained in the box around the sides.

In Fig. 3 is shown a preferred form of a portion of the cover 18. The portion of the cover 18 adjacent the front of the opening 19 is slightly raised as shown at 22. This raised portion serves to prevent any tendency of peas or seed from traveling down the inclined cover which has become loosened or shaken from the vines in their passing backwardly over the cover after having been cut by the cutter bar 12 of a mower. In Fig. 4 it is to be noted that the structure shown is identical with that of Fig. 4 except that the raised portion 22 is omitted.

It can readily be seen that a man following this attachment may, with a rake, easily draw the peas or clover seed directly rearwardly over this attachment after the vine or clover has been cut by the cutter. The swath, as it is being raked or carried backwardly, will be freed from the shelled seed which will drop through the openings 19 on to the tongues 20 and thence to the seed box 10.

It will also be observed that this attachment is of exceedingly simple construction and readily applied and removed as required.

Having thus described my invention, what I claim as new and desire to secure by Letters Patent is—

1. A seed gathering attachment for mowers comprising a seed box provided at its front end with means for attachment with a cutter bar of a mower and increasing in depth rearwardly, runners secured to the rear portion of the box, a hinged cover for the box, said cover conforming in shape to the shape of the box and provided with a plurality of openings, and an inwardly projecting tongue struck from said cover in proximity to each of said openings for preventing seed from escaping from said box through said openings.

2. A seed attachment for mowers comprising a seed box provided at its front end with means for attachment with a cutter bar of a mower and increasing in depth rearwardly, runners secured to the rear portion of the box, a hinged cover for the box, said cover conforming in shape to the shape of the box and provided with a plurality of openings, a raised portion formed integral with said cover at each of said openings, and an inwardly projecting tongue struck from said cover in proximity to each of said openings for preventing seed from escaping from said box through the openings.

3. The combination with a cutter bar of a mower, of a rearwardly extending seed box increasing in depth toward its rear end, runners secured to the rear portion of said box, a cover for the box provided with a plurality of openings and hinged to the rear end of said box, the edges of the cover being provided with U-shaped sockets for receiving the edges of the sides of the box, and an inwardly projecting tongue struck from said cover in proximity to each of said openings for preventing seed from escaping from the box through said opening.

4. The combination with a cutter bar of a mower, of a rearwardly extending seed box increasing in depth toward its rear end and provided with rearwardly converging sides, runners secured to the rear portion of the box provided with upwardly turned free ends, a hinged cover for the box provided with U-shaped sockets at the edges thereof for receiving the edges of the sides of the box, and a plurality of openings arranged in rows, the openings of one row being staggered with respect to the openings of the adjacent row; a plurality of inwardly projecting tongues struck from said cover, each of said tongues in proximity to an opening, and a raised portion formed integral with said cover at each of said openings.

AMOS N. TIMMS.

Copies of this patent may be obtained for five cents each, by addressing the "Commissioner of Patents, Washington, D. C."